Feb. 24, 1959          M. C. PHARO          2,874,838

ASBESTOS FIBER RECOVERY FROM TAILINGS

Filed Sept. 28, 1954          3 Sheets-Sheet 1

INVENTOR
MERRITT C. PHARO
BY
ATTORNEY

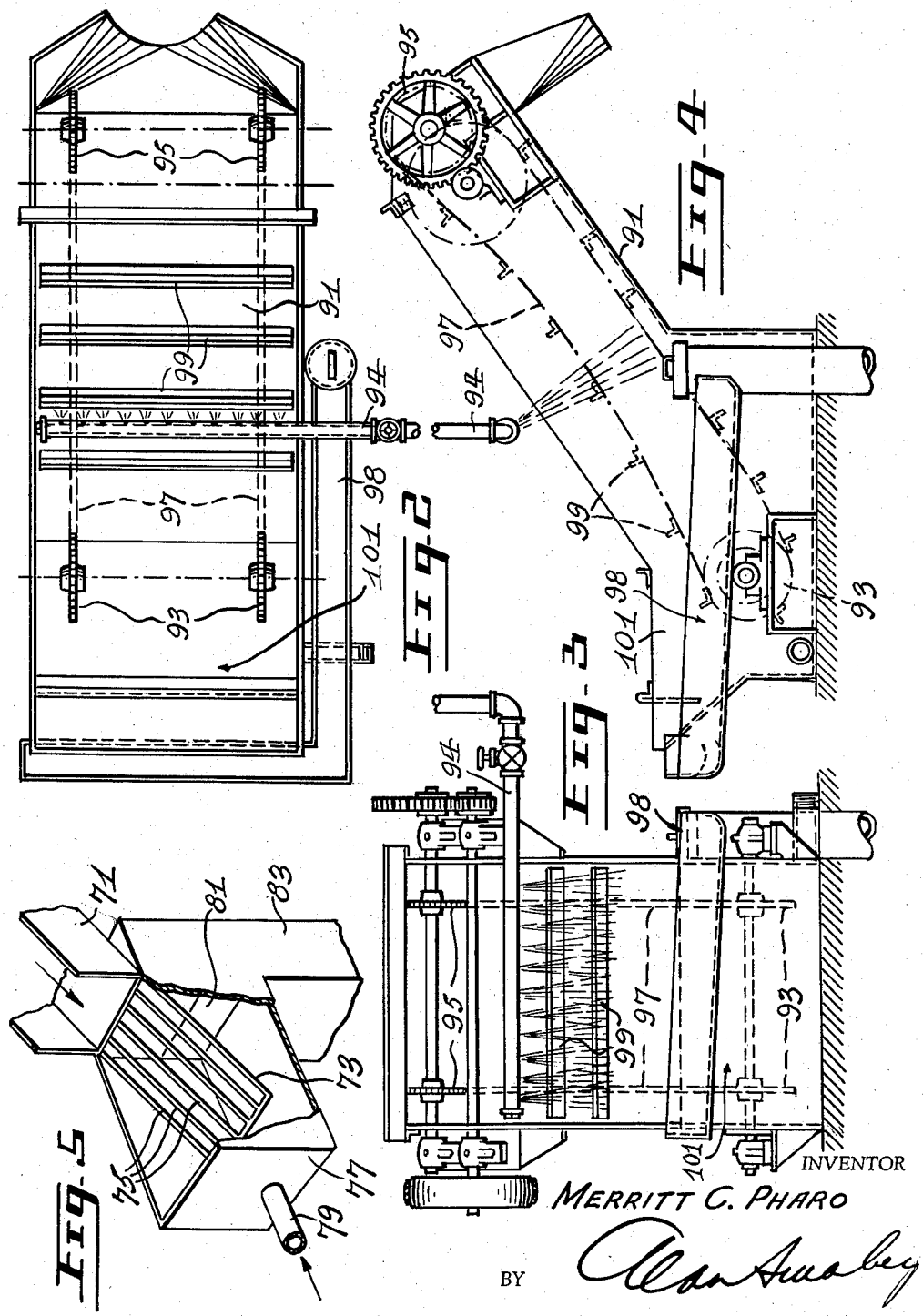

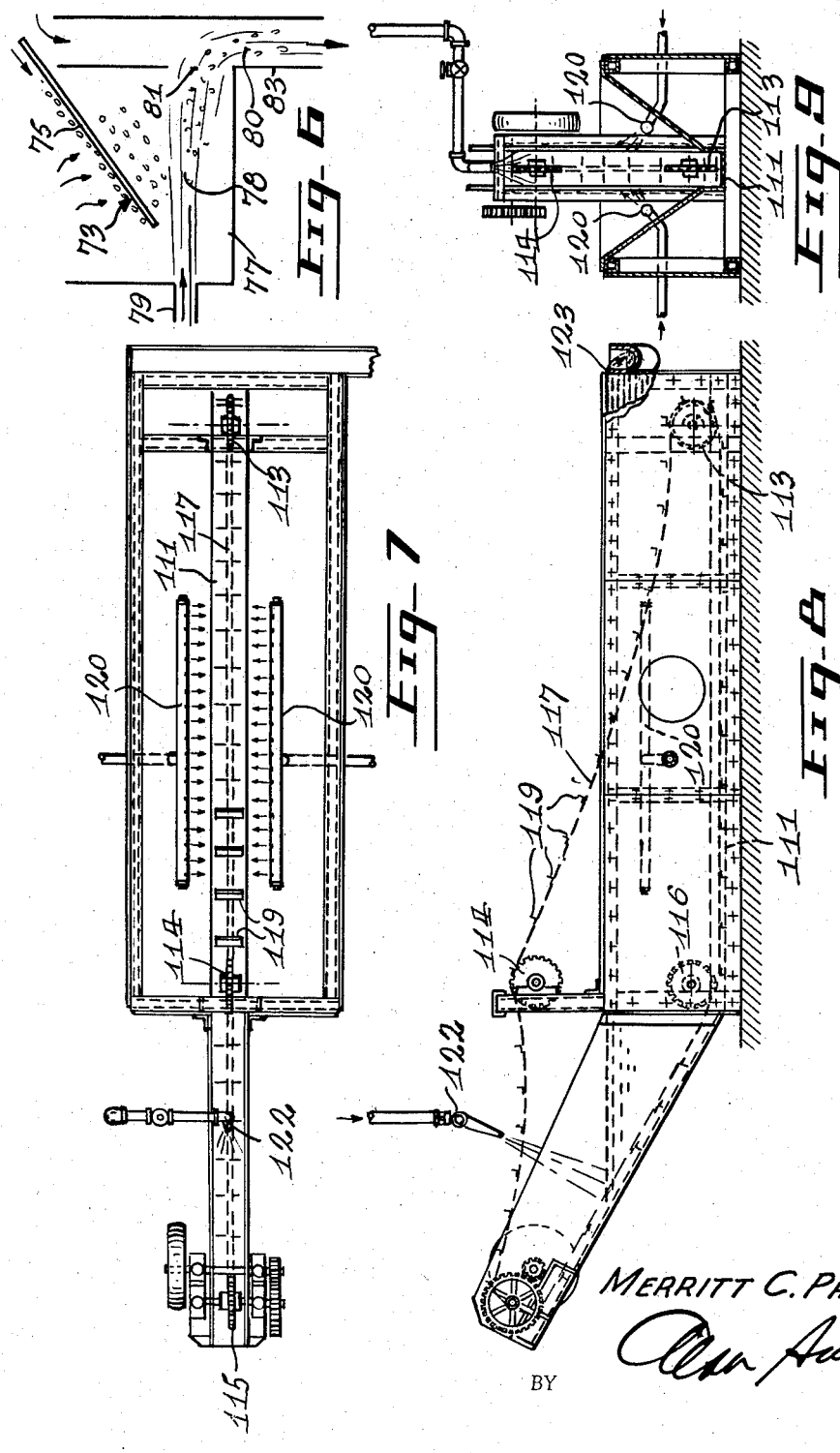

United States Patent Office 2,874,838
Patented Feb. 24, 1959

2,874,838

ASBESTOS FIBER RECOVERY FROM TAILINGS

Merritt C. Pharo, Thetford Mines, Quebec, Canada, assignor to Johnson's Company Limited, Thetford Mines, Quebec, Canada, a corporation of Canada Application September 28, 1954, Serial No. 458,936

4 Claims. (Cl. 209—18)

This invention relates to the recovery of asbestos tailings.

This application is a continuation-in-part of application Serial No. 88,518, filed April 20, 1949, now Patent No. 2,695,707, issued November 30, 1954.

The usual commercial method of recovering asbestos is by dry-pressing the ore as outlined in the above application and as further detailed in the handbook "Chrysotile Asbestos in Canada" by James Gordon Ross and published by The Canadian Department of Mines and in "Handbook of Mineral Dressing" by Taggart, second printing March 1947, by John Wylie & Sons, Inc.

The unrecovered asbestos is left as tailings which may be classified as mill tailings and weathered dump tailings.

Mill tailings are discarded directly from the dry process. The rock has been reduced by numerous crushings to a relatively small size of about ½ an inch and lower. These tailings contain short asbestos fibre in amount from about 1% to about 8%.

Weathered dump tailings have been on the dump for some time. The rock is reduced to about ½ an inch and lower. The tailings contain from about 1 to 8% of short asbestos fiber. About 95% of the tailings aggregate is serpentine rock. By weathering, the individual fibers have become stuck to the rock and are extremely hard to remove. About 60% to about 75% of the fibers is in the fluffed state. And, although this fiber is free from the rock, it has a tendency to adhere to the rock and the individual fibers have a tendency to adhere together in small bundles which are particularly difficult to separate.

The problem of treating tailings has not been satisfactorily solved by the prior art.

The present invention provides expedients for recovering asbestos from tailings and is particularly adapted to the acute problem of handling weathered dump tailings.

According to the present method, tailings material is treated as follows:

Tailings are recovered from the mill pile or from the weathered dump. Agglomerated masses of tailings are broken up where necessary. In a dispersed condition, the tailings are subjected to primary drag classification in the presence of an amount of water effective to allow a flotational effect to take place. Preferably, the water is mixed with the dispersed tailings before the mixture is fed to the drag classifier. Preferably, the charge is adjusted to have a dilution of from about 16 to about 23% solids. Preferably, also, air is entrained in the solid material as it is introduced into the water. This entrained air assists the flotation of the fibre as it is separated from the rock by the drag classification action.

The asbestos thus separates as an overflow product. The majority of the rock is discarded as the underflow, so that the recovery of fiber is high.

The overflow product is passed directly to a secondary drag classification step. It is not necessary to add additional water. But, preferably, compressed air is passed into the charge from below to cause agitation and aeration effective to assist the separation. Again the asbestos floats off in the overflow product.

A result of the two drag classification steps is to remove most of the rock or gangue. The ratio of concentration achieved by the first drag classification step is about 5.35, and by the second, about 1.4. The tailings are thus reduced to about 2/15 of their original weight. The fiber content, meanwhile, increases from about 1 to about 8% in the feed, to about 5 to about 36% in the first overflow product, to about 7 to about 50% in the second overflow product. The loss of fiber in the first classification step may be kept at not more than ¾% and in the second step at not more than ¼%.

It is desirable to further isolate the fiber and this is preferably done by hydraulic shaken-bed classification. The secondary drag classification overflow product is formed into an aqueous slurry containing from about 1% to about 15% solids. And this slurry is passed to a shaking table, as for example, described in the prior application above referred to. The concentration achieved by this step gives an end product approximately 1/10 by weight of the tailings fed to the primary classifier at the beginning of the process, and containing from about 9 to about 65% by weight of fibre. The loss of fiber in the tabling step may be held to not more than about ¼% to about ½% by weight.

Now that the invention has been generally described, it will be referred to in more detail by reference to the preferred embodiments which are illustrated in the accompanying drawings, in which:

Figure 2 is a top plan view of the primary classifier.

Figure 3 is an end view of the classifier shown in Figure 2.

Figure 4 is a side elevation of the classifier shown in Figures 2 and 3.

Figure 5 is a perspective view showing fragmentarily the means of feeding broken-up tailings masses to the primary classifier.

Figure 6 is a side elevation illustrating the operation of the feeding means shown in Figure 5.

Figure 7 is a top plan view of the secondary classifier.

Figure 8 is a side elevation of the secondary classifier shown in Figure 7.

Figure 9 is an end elevation of the classifier shown in Figures 7 and 8.

Figure 1:
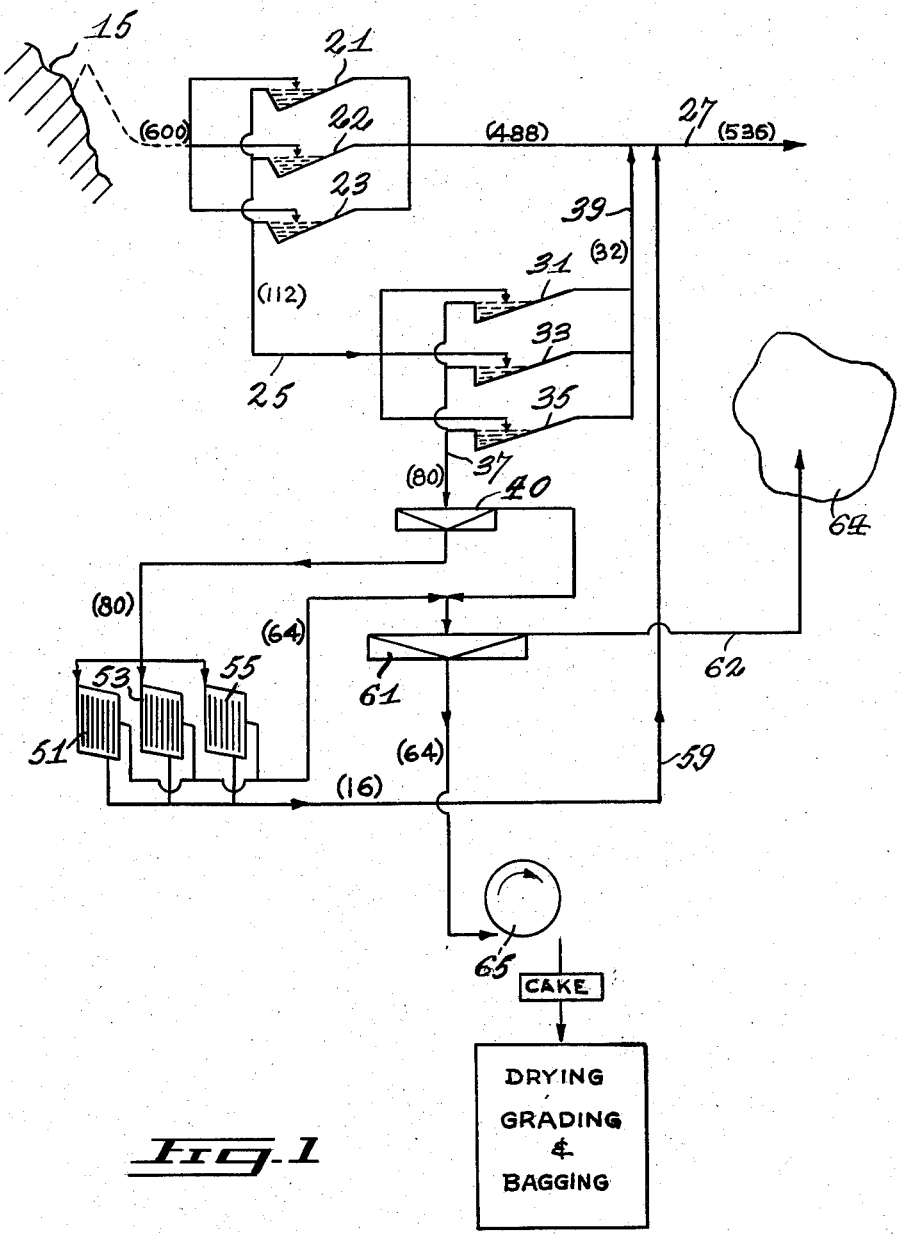
Figure 1 is a flow sheet process diagram showing a preferred procedure and pieces of apparatus used in this procedure.

Now reference will be made to the figures, particularly Figure 1 to start with.

15 represents an asbestos dump of the type found at Thetford Mines, Quebec, and other asbestos centres. This dump contains "weathered dump tailings."

As illustrated, the dump material is broken up and fed in parallel to a number of primary drag classifiers, 21, 22 and 23 (illustrated in detail in Figures 2, 3 and 4). The overflow product from these classifiers passes to the line 25. The waste is discarded through the line 27.

The overflow on the line 25, is passed in parallel to a group of secondary drag classifiers, 31, 33 and 35 (illustrated in detail in Figures 7, 8 and 9). The overflow product passes into the line 37. The waste product passes into the line 39 and thus to the waste dump.

The overflow product from the line 37 is passed into a thickener 40. The thickened product passes in parallel to a number of shaking tables 51, 53 and 55, preferably of the type described in the applicant's copending application.

After leaving the shaking tables 51, 53 and 55, the overflow product is passed to a further thickener 61, which serves also as the storage tank for pulp. Excess water from the thickener 61 goes through the line 62 to the pond 64. Floating contaminants, chiefly wood, are removed at this point with the excess water.

From the thickener, the thickened material goes to a filter 65, from which it is taken as a cake and the cake is passed to a drying and grading circuit and then to the bagging machines. The waste product from the shaking tables is passed off in line 59 to the waste.

CHARACTERISTICS OF INDIVIDUAL STEPS

Preliminary treatment of dump tailings

The dump material is excavated for example, by means of a scraper. The compacted tailings are broken up into a loose aggregate and scraped down into a hopper at the toe of the dump. The hopper discharges to a conveyor belt which delivers into the chute feeding the drag classifiers 21, 22 and 23.

Entrainment of air takes place during the scraping and feeding operations. This is desirable for the proper operation of the process. Figures 5 and 6, describe the manner of feed. The broken-up tailings are fed down a chute 71 which discharges through a screen 73 having spaced-apart parallel bars 75. The screen 73 is within a feed box 77 having a water inlet from a pipe 79 and an outlet 81 into a feed chute 83 which leads to the primary classifier.

The water and the broken-up tailings are thus mixed in the feed box 77 and passed together down the chute 83 to the primary classifier. Preferably, the dilution is from about 16% to about 23% solids, best around 16 to 18% solids.

The manner of entrainment of air is shown in Figure 6. As the tailings aggregates are separated on the screen 73, air is entrained with them and passes into the water stream as shown at 78 to form the feed 80 which goes down the chute 83.

Primary classifier

The primary classifier is shown in Figures 2, 3 and 4. It is a drag classifier having characteristics similar to those described in connection with the Esperanza classifier in the "Handbook of Mineral Dressing," by Taggart, copyright 1945, second printing, March 1947, published by John Wylie & Sons, Inc. The description is at section 8, page 15 (8–15)—"4. Drag Classifier."

Such a device is illustrated in Figures 2, 3 and 4. It includes a pair of drive supporting rollers 93 and 95 carrying a belt 97 including working elements or drags 99. The action of the device is to drag solids from the bottom of the floor 91 towards the top and thus to lift them out of flotation vessel of the machine while the lighter material floats in the pool 101 and discharges from the overflow end at 98. Further cleaning takes place after the drags leave the pool, by means of the water spray 94.

Secondary classifier

The secondary classifier used by the applicant is preferably of the same type as the primary classifier. Like the primary classifier, the device has rollers 113 and 115 and auxiliary rollers 114 and 116 which carry a belt 117 having drags 119, etc., which rake the solids from the right-hand or bottom end of the bed 111 toward the top. The water spray 122 provides further cleaning of the raked sands prior to discharge. The overflow is at 123.

The secondary classifier has a larger pool area to allow for the settling of the finer sands. Compressed air is introduced via the air sprays 120 for the purpose of causing effective flotation of the asbestos fibers.

Shaken-bed classification

The shaken-bed classification is performed on the shaking tables. A suitable type of shaking table is described in the applicant's prior application 88,518. This table is a "Deister Plat-O" coal washing table as described in "Bulletin 30" of the Deister Machine Company. The Taggart handbook referred to above, also describes the structure and operation of shaking tables of this type.

The overflow from the secondary drag classification step is prepared for treatment on the shaking table by thickening in the thickener 40 so that the product going to the shaking table will be an aqueous slurry containing from about 1% to about 15% solids.

Example

To give further indication of the working of the invention, an example will be given of actual runs which were carried out in accordance with the invention, and with using process steps and apparatus features as outlined above.

In this case, weathered dump tailings were treated. The tailings material contained from about 1% to about 8% of short chrysotile asbestos fiber in which from about 60% to about 75% was in the fluffed state. The remainder was about 95% rock and of a size of about ½ inch or smaller. The asbestos was adherent to the rock. The fibers were adherent together in small bundles. Both these conditions made removal of the fiber from the rock and the separation of the fibers from the bundles, difficult. The dump was a typical weathered tailings dump at Thetford Mines, Quebec.

The tailings were excavated by means of a scraper. The compacted tailings were broken up into a loose aggregate and scraped into a hopper at the toe of the dump. The hopper discharged to a conveyor belt which delivered into the chute, feeding the drag classifiers. Entrainment of the air took place during the scraping and feeding operations as described above, in connection with the drawings.

Tailings as specified above were fed to the primary classifier. These tailings had an average fiber content of 5%.

For the purpose of the following quantities, assume the dry solids content of the feed equals 100 parts by weight, fed in a unit of time.

The reject amounted to 80 parts solids, 12 parts water, that is, 87% solids. 90% of the solids were plus 28 mesh. The fiber represented .7% of the mill feed and .9% of the reject solids.

The overflow product coming from the primary classifier represented 20 parts of solids and 480 parts of water or 4% solids. 90% of the solids were minus 20 mesh. The fiber represented 4.3% of the mill feed and 21.5% by weight of solids in the overflow product.

The feed to the secondary classifier was the overflow product of the primary classifier. The feed contained 4% solids. The reject contained 6 parts solids, 12 parts of water, that is, 33% solids. 35% of the solids were plus 28 mesh. The fiber represented .2% of the mill feed, 3.3% of reject solids.

The overflow product from the secondary classifier represented 14 parts solids, 468 parts water, that is, 3% solids. 90% of the solids were minus 28 mesh. The fiber represented 4.1% of the mill feed and 29.2% of the solids in the overflow product. This product was fed to the thickener.

The overflow from the secondary classifier was thickened and treated on shaking tables, run through another thickening operation and then through a filter to form a cake which was dried, graded and bagged.

The performance of typical runs is shown in the following Table 1. "Ratio of concentration" is defined as the ratio of the weight of the feed in a given operation to the weight of concentrate obtained from it. "Recovery" is defined in this case as the weight of marketable fiber in the concentrate of a given operation expressed as a percentage of the marketable fiber in the feed.

TABLE 1

| | Ratio of Concentration | Recovery, percent | Fibre Loss (percent of Mill Feed) |
|---|---|---|---|
| Primary Classifiers | 5.35 | 88 | 0.7 |
| Secondary Classifiers | 1.4 | 96 | 0.2 |
| Shaking Tables | 1.25 | 99 | Negligible |
| Whole Process | 9.4 | 84.5 | 0.9 |

For typical runs according to the above specifications, figures are shown in Figure 1. The bracketed figures given at the various communicating lines between the apparatus represent average daily tonnage figures.

I claim:

1. A process for the recovery of asbestos, comprising, taking tailings masses from an asbestos dump, said tailings material containing from about 1% to about 8% of short chrysotile asbestos fiber in which from about 60% to about 75% is in the fluffed state, the remainder being about 95% rock and of the size of one half inch or smaller in which the asbestos fiber is generally adherent to the rock and the fibers are generally adherent together in small bundles, breaking up the tailings masses and dropping the broken up masses into a stream of water, thereby entraining air therein carrying the tailings in said stream to a classification pool, subjecting the broken up tailings masses in said pool to primary drag classification at a dilution of from about 16% to about 23% solids in water in the presence of the entrained air thereby to separate fiber from the rock, floating off the fiber in an overflow product, subjecting the primary overflow product to secondary drag classification while subjecting it to the action of compressed air thereby to separate the fiber from rock and floating the fiber in the overflow product, forming from the secondary overflow product an aqueous slurry containing from about 1% to about 15% solids, subjecting the slurry to hydraulic shaken bed classification thereby to separate further the fiber from the rock, and thus recovering the fiber effectively free from gangue.

2. A process for the recovery of asbestos fiber from tailings masses comprising breaking up the masses, dropping the broken up masses through a screen into a stream of water and thereby entraining air therein, carrying the tailings in said stream to a classification pool, subjecting the masses in said pool in the presence of the entrained air to hydraulic drag classification, thereby to separate the gangue from the fiber, and recovering an overflow product containing the fiber, subjecting the said overflow product to further hydraulic classification while injecting compressed air into the water thereby to separate further gangue from the fiber and provide an overflow product containing the fiber freed from substantial amounts of gangue.

3. A process for the recovery of asbestos fiber from tailings masses comprising, breaking up the masses, dropping the broken masses through a screen into a stream of water thereby entraining air therein, carrying the tailings in said stream to a classification pool, subjecting the asbestos in the presence of the entrained air in said pool to hydraulic drag classification thereby to separate the gangue from the fiber, and recovering an overflow product containing the fiber, subjecting the said overflow product to further hydraulic classification while injecting compressed air into the water thereby to separate further gangue from the fiber and provide an overflow product containing the fiber freed from substantial amounts of gangue, subjecting said last named overflow product to hydraulic shaken-bed classification thereby to remove further gangue from the fiber, and recovering the fiber effectively free from gangue.

4. A process for the recovery of asbestos, comprising taking tailings masses containing from about 1% to about 8% of short chrysotile asbestos fiber which from about 60% to about 75% is in the fluffed state, the remainder being about 95% rock of a size of ½" or smaller in which the asbestos is generally adherent to the rock and the fibers are generally adherent together in small bundles, breaking up the tailings masses and dropping them into a stream of water whereby air is entrained therein, carrying them in said stream to a classification pool, subjecting the broken up tailings masses containing the entrained air in said pool to primary hydraulic drag classification at a dilution of from about 16% to about 23% solids, thereby to separate fiber from rock, and floating off the fiber in an overflow product.

References Cited in the file of this patent

UNITED STATES PATENTS

| 1,624,163 | Dolbear et al. | Apr. 12, 1927 |
| 2,065,722 | Munro | Dec. 29, 1936 |
| 2,500,154 | Crockett | Mar. 14, 1950 |

FOREIGN PATENTS

| 254,796 | Great Britain | July 8, 1926 |